Patented Sept. 7, 1926.

1,599,198

UNITED STATES PATENT OFFICE.

GEORGE BARSKY, OF NEW YORK, N. Y., ASSIGNOR TO AMERICAN CYANAMID COMPANY, OF NEW YORK, N. Y.

FERTILIZER.

No Drawing.   Application filed July 28, 1923. Serial No. 654,464.

This invention relates to a method of lessening the risk of fire that is always present when nitrate of soda is handled, and particularly when incorporated, or in contact with organic matter in any form. Fertilizer manufacturers have experienced considerable trouble in handling this material both in a mixed and unmixed condition. It is sought in this invention to disclose a method by which nitrate of soda may be mixed as soon as it reaches the plant, and a product formed that will not be liable to spontaneous combustion, and will be dry, granular and possess value as a fertilizer.

The object of this invention is to afford a method of handling a troublesome chemical constituent so that it may be incorporated in a fertilizer material as soon as possible after reaching the plant, and that all danger of fire may be removed both before or during mixing. With these and other objects in view the invention consists in the various steps and combinations of steps constituting the process and in the new product, all as will be more fully hereinafter described and particularly pointed out in the claims.

To more fully illustrate my invention I may mix 1250 parts by weight of acid phosphate, 750 parts by weight of nitrate of soda, and 250 parts by weight of calcium cyanamid, and allow the whole to cure in a pile as is customary. The above mixture gives a dry, granular fertilizer material.

It has always been necessary to store nitrate of soda very carefully and have a practically fire-proof storage space, preferably removed from the rest of the plant. As the capacity was frequently too small to hold large shipments, fertilizer manufacturers were always anxious to mix the nitrate of soda and acid phosphate as soon as possible. This would eliminate the danger of fire but led to serious trouble in other directions. The mass was invariably wet, soggy and in a physical condition that made it hard to work up. To overcome this and still mix the nitrate of soda as soon as received, some manufacturers were in the habit of adding a drying agent such as cotton seed meal. The difficulty was overcome in this way but the fire-risk was increased. If the temperature was allowed to rise at all rapidly spontaneous combustion invariably followed and frequently the whole plant was destroyed.

There was also a very considerable danger that a fire would occur even in the absence of organic matter in the mix, as the bags were liable to take fire if the product were bagged too soon after mixing.

I have now discovered that the trouble may be overcome by simultaneously mixing calcium cyanamid with the mass, and allowing the whole to cure in the usual way.

It is obvious that those skilled in the art may vary the details of the process without departing from the spirit of the invention, therefore, I do not wish to be limited to the above disclosures except as may be required by the claims appended hereto.

I claim:

1. A method of eliminating the fire-risk in the manufacture of a fertilizer material containing a nitrate which comprises adding substantially less than 50% of calcium cyanamid to the material; substantially as described.

2. A method of eliminating the fire-risk in the manufacture of a fertilizer material containing nitrate of soda which comprises adding substantially less than 50% of calcium cyanamid to the material; substantially as described.

3. A method of eliminating the fire-risk in the manufacture of a fertilizer material containing nitrate of soda and in contact with organic matter which comprises adding a minor proportion of calcium cyanamid to the material; substantially as described.

4. A method of eliminating the fire-risk in the manufacture of a fertilizer material containing 750 parts by weight of nitrate of soda which comprises mixing approximately 1250 parts by weight of acid phosphate, and 250 parts by weight of calcium cyanamid with the nitrate of soda; substantially as described.

5. A new fertilizer material comprising a nitrate which is liable to ignite organic material in contact with the same, and sufficient calcium cyanamid to prevent such ignition; substantially as described.

6. A new fertilizer material comprising a mixture of nitrate of soda and acid phosphate, the above being present in such proportions as to be liable to ignite organic matter with which it comes in contact, and sufficient calcium cyanamid to form a dry, granular mass, that is not liable to ignite organic matter with which it comes in contact; substantially as described.

GEORGE BARSKY.